United States Patent [19]
Murphey et al.

[11] Patent Number: 6,065,219
[45] Date of Patent: May 23, 2000

[54] METHOD AND APPARATUS FOR DETERMINING THE SHAPE OF AN EARTH BOREHOLE AND THE MOTION OF A TOOL WITHIN THE BOREHOLE

[75] Inventors: Carey R. Murphey, Bellaire; Georgios L. Varsamis, Houston; Laurence T. Wisniewski, Houston; Chen-Kang David Chen, Houston, all of Tex.

[73] Assignee: Dresser Industries, Inc., Dallas, Tex.

[21] Appl. No.: 09/161,107

[22] Filed: Sep. 25, 1998

Related U.S. Application Data

[60] Provisional application No. 60/090,709, Jun. 26, 1998.

[51] Int. Cl.⁷ .......................... G01B 21/20; G01B 15/04; E21B 47/00; E21B 47/022
[52] U.S. Cl. .................................. 33/544; 33/302; 33/304
[58] Field of Search .............................. 33/544, 302, 304, 33/313, 542, 543, 544.1, 544.2, 546

[56] References Cited

U.S. PATENT DOCUMENTS

| | | | |
|---|---|---|---|
| 2,596,023 | 5/1952 | Goble et al. | 33/544 |
| 4,611,405 | 9/1986 | Van Steenwyk | 33/304 |
| 4,958,125 | 9/1990 | Jardine et al. | 324/162 |
| 5,128,867 | 7/1992 | Helm | 33/302 |
| 5,469,736 | 11/1995 | Moake | 73/151 |
| 5,565,624 | 10/1996 | Deboaisne et al. | 33/544 |
| 5,638,337 | 6/1997 | Priest | 367/27 |
| 5,737,277 | 4/1998 | Priest | 367/27 |

FOREIGN PATENT DOCUMENTS

| | | | |
|---|---|---|---|
| 76144 | 4/1983 | European Pat. Off. | 33/544 |
| 2156984 | 10/1985 | United Kingdom | 33/544 |

OTHER PUBLICATIONS

Priest, *Computing Borehole Geometry and Related Parameters from Acoustic Caliper Data*, SPWLA 38$^{th}$ Annual Logging Symposium, Houston, TX, Jun. 15–18, 1997, pp. 1–13.

Moake, et al., *Standoff and Caliper Measurements While Drilling Using a New Formation–Evaluation Tool with Three Ultrasonic Transducers*, SPE Drilling & Completion, Jun. 1995, pp. 104–111.

Birchak, et al., *Standoff and Caliper Measurements While Drilling Using a New Formation–Evaluation Tool with Three Ultrasonic Transducers*, SPE Paper No. 26494, 68$^{th}$ Annual Technical Conference and Ehibition, Houston, TX, Oct. 3–6, 1993, pp. 104–111.

*Primary Examiner*—Christopher W. Fulton
*Attorney, Agent, or Firm*—Cox & Smith Incorporated

[57] ABSTRACT

A method and apparatus are provided for estimating the cross-sectional shape and orientation of an earth borehole and the motion of a tool therein. The method and apparatus involve measuring the distance from the tool to the borehole wall at a plurality of locations around the periphery of the tool and fitting those measured distances to a predetermined shape function using a nonlinear parameter estimation technique to minimize the error between the estimated shape of the borehole and the measured distances. The method and apparatus may be used to estimate elliptical and higher order borehole shapes. Additionally, the method and apparatus may be used while drilling the borehole.

81 Claims, 6 Drawing Sheets

METHOD AND APPARATUS FOR DETERMINING THE SHAPE OF AN EARTH BOREHOLE AND THE MOTION OF A TOOL WITHIN THE BOREHOLE

This application claims priority from U.S. provisional application Ser. No. 60/090,709 filed Jun. 26, 1998.

BACKGROUND OF THE INVENTION

1. Field of the Invention

This invention relates generally to a method and apparatus for determining the shape and orientation of a borehole traversing an earth formation and the motion of a tool within the borehole while drilling the borehole. More specifically, this invention relates to a nonlinear parameter estimation technique used to approximate the shape of an earth borehole by measuring the distance from the tool to the borehole wall at a plurality of locations around the periphery of the tool and fitting those measured distances to a predetermined shape function in such a manner as to minimize the error between the estimated shape and the measured distances.

2. Description of the Related Art

The cross-sectional shape of a borehole traversing an earth formation is useful in ascertaining other valuable information regarding various properties of the formation, such as stress, porosity, and density. Several methods to obtain information about the shape of a borehole are described in U.S. Pat. No. 5,469,736 to Moake, U.S. Pat. No. 5,638,337 to Priest, U.S. Pat. No. 5,737,277 to Priest, and references cited therein, each of which is incorporated herein by reference. Such methods generally employed acoustic or mechanical calipers to measure the distance from the tool to the borehole wall at a plurality of points around the perimeter of the tool.

However, the method described in the '736 patent appears to be based on the assumption that the borehole shape is circular, or at least that the shape may be approximated by an "equivalent" circle, i.e., a circle having an area equivalent to that of the actual borehole. A significant drawback to that method is that, in reality, the borehole shape is often not circular but is rather of an elliptical or even more complex shape. Therefore, under many circumstances, that method does not accurately describe the true borehole shape. Furthermore, although the methods described in the '337 and '277 patents do account for the ellipticity of a borehole and tool rotation during measurement, those methods assume that the tool does not translate in the borehole during measurement. During drilling operations, however, the tool is rarely free from translational motion. Thus, those methods generally do not provide satisfactory results in a measuring while drilling (MWD) mode of operation. Additionally, the '337 and '277 patents do not account for borehole shapes that are more complex than an ellipse.

Regarding the motion of a rotating tool within a borehole, U.S. Pat. No. 4,958,125, issued Sep. 18, 1990, to Jardine et al., discloses a method and apparatus for determining the lateral acceleration of the tool using accelerometers. As discussed below, the method of the '125 patent is directed to a vertical drill string orientation and does not account for the contribution of gravity to the accelerometer signals. However, in modern petroleum well drilling and logging, the drill string is frequently not in a vertical orientation. Thus, the method and apparatus of the '125 patent does not solve a significant problem in the art.

It would, therefore, be a significant advance in the art of petroleum well drilling and logging to provide a method and apparatus for accurately determining the shape and orientation of an elliptical or more complex earth borehole and the motion of a tool therein while drilling the borehole in any general inclined direction.

SUMMARY OF THE INVENTION

Accordingly, it is an object of this invention to provide an improved downhole method and apparatus for accurately estimating the shape and orientation of an elliptical or more complex earth borehole while drilling said borehole. Additionally, it is another object of the present invention to provide an improved method and apparatus for calculating the lateral motion of a drilling tool within an elliptical or more complex earth borehole while drilling said borehole.

BRIEF DESCRIPTION OF THE DRAWINGS

This invention may best be understood by reference to the following drawings.

DETAILED DESCRIPTION OF A PREFERRED EMBODIMENT

Figure 1:
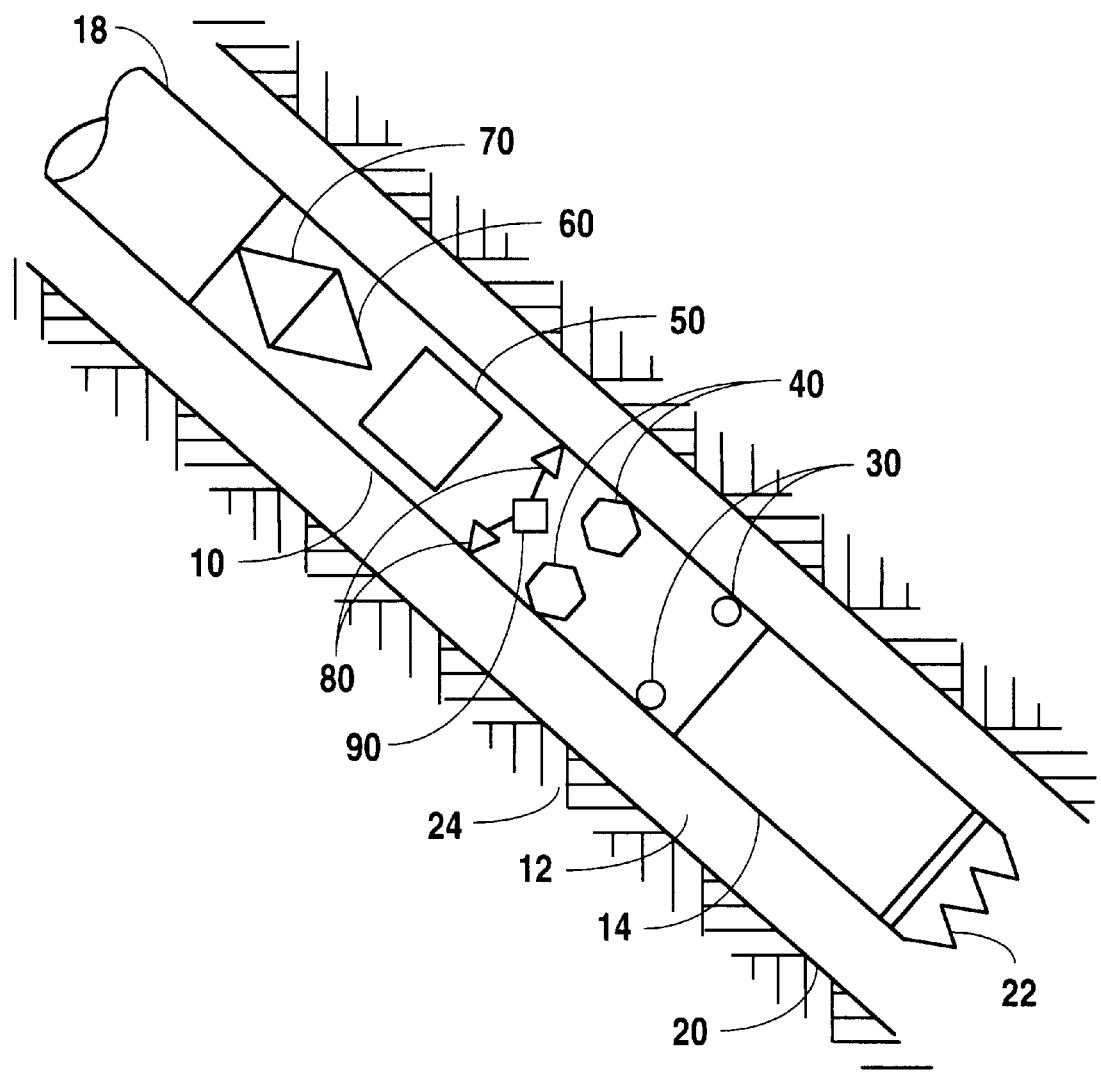
FIG. 1 is a schematic elevational view of an MWD tool in accordance with the present invention disposed within an earth borehole.

Referring to FIG. 1, a preferred embodiment of this invention comprises a tool 10, preferably an MWD tool, mounted in a section of a rotating drill string 18 disposed within a borehole 12 traversing an earth formation 24. A drill bit 22 is mounted at the bottom of the drill string 18 to facilitate the drilling of the borehole 12. Drill bit 22 is connected to the drill string 18 with a drill collar 14. Tool 10 preferably includes three distance sensors 30 (only two are shown in FIG. 1) to measure the distance from the tool 10 to the borehole wall 20 and at least one angle sensor 40 to measure the orientation of the borehole 12 with respect to a reference direction, such as the direction of the earth's gravity or the direction of magnetic north. Tool 10 also preferably includes two pairs of accelerometers 80 (only one pair is shown in FIG. 1) and a high-pass filter 90 to help define the motion of the tool 10 within the borehole 12. Additionally, tool 10 comprises a signal processor 50 to process the signals from the distance sensors 30, angle sensors 40, and accelerometers 80 in order to determine the shape and orientation of the borehole 12 as well as the motion of the tool 10 within the borehole 12. Tool 10 further includes at least one of the following data disposition devices, namely, a data storage device 60 to store parameter estimation data and a data transmitter 70, such as a conventional mud pulse telemetry system, to transmit parameter estimation data to the surface.

Figure 2:
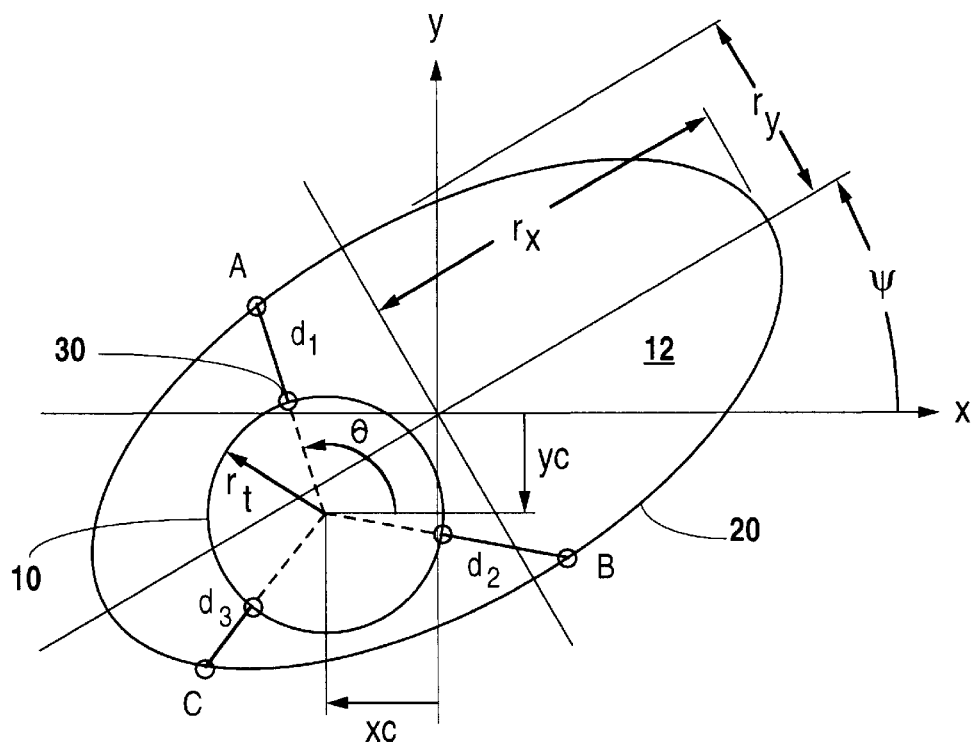
FIG. 2 is a schematic sectional view of an MWD tool in accordance with the present invention disposed within an earth borehole.

The distance sensors 30 are preferably acoustic calipers (transceivers) of the type disclosed in application Ser. No. 08/920,929 filed Aug. 29, 1997, by Arian et al., which is incorporated herein by reference. Alternatively, the distance sensors 30 may be conventional mechanical calipers or electrical resistance sensors. In a preferred embodiment, three distance sensors 30 are equally spaced (120° apart) around the perimeter of the tool 10, as shown in FIG. 2. The angle sensors 40 are preferably magnetometers, inclinometers, or accelerometers; however, other sensor types, such as gyroscopes, may also be used. The function of the angle sensors 40 is to provide a sinusoidal electrical signal as the tool 10 rotates that indicates the orientation of the tool 10 with respect to either the direction of gravity or magnetic north. A gravity-type sensor (such as an inclinometer or accelerometer) does not function satisfactorily when the axis of the tool 10 is aligned with the gravitational direction (i.e., in a vertical orientation), and a magnetic-type sensor (such as a magnetometer) does not function satisfactorily when the axis of the tool 10 is aligned with the magnetic north direction. Therefore, the tool 10 should preferably comprise at least one gravity-type sensor 40 and at least one magnetic-type sensor 40 so that a satisfactory angle signal is acquired for any orientation of the axis of the tool 10.

According to the present invention, (1) the distance from the tool 10 to the borehole wall 20 is measured at a plurality of locations around the periphery of the tool 10 and (2) the rotational angle of the tool 10 with respect to a reference direction, such as the direction of gravity or magnetic north, is measured. These distance and angle measurements are made at a plurality of times corresponding to a plurality of different rotational positions of the tool 10 within the borehole 12. The measured distances and angles are then optimally fit to a predetermined shape function using a nonlinear parameter estimation technique to minimize the error between the estimated shape and the measured distances. For an elliptical shape approximation, the plurality of measurement times must be at least two, and for more complex shapes described by more than three parameters the plurality of measurement times must be at least three or more, depending on the complexity of the shape. For purposes of discussion only, and without limiting the scope of the present invention, each set of distance and angle measurements associated with a discrete measurement time will be referred to as a "firing" in accordance with the use of acoustic calipers as the distance sensors 30.

Referring to FIG. 2, the shape and orientation of an elliptical borehole 12 may be defined by specifying the major radius, $r_x$, the minor radius, $r_y$, and the angle $\psi$ between the major axis and a reference direction, x, such as the direction of gravity or magnetic north. The position of the tool 10 within the borehole 12 may then be defined by specifying the coordinates (xc,yc) of the tool center and the angle θ between a reference radial line on the tool 10 and the reference direction, x. For simplicity, the reference radial line is preferably aligned with the first distance sensor 30.

For each firing, the acoustic distance sensors 30 measure the distances $d_i$ (i=1, 2, 3) according to the equation $$d_i = v_m \frac{t}{2} \quad \text{Eq. [1]}$$

where $v_m$ is the acoustic velocity through the mud between the tool 10 and the borehole wall 20 and t is the round trip transit time of the acoustic signal between the tool 10 and the borehole wall 20. The distances $r_i$ (i=1, 2, 3) from the center of the tool 10 to the borehole wall 20 are then calculated according to the equation $$r_i = d_i + r_t \quad \text{Eq. [2]}$$

where $r_t$ is the radius of the tool 10. Also at each firing, the angle sensors 40 measure the rotational angle θ. Thus, each firing n (n=1, 2, 3, ..., N) produces the following set of data:

$$\text{data}_n = \{r_1, r_2, r_3, \theta\}_n \quad \text{Eq. [3]}$$

Figure 3:
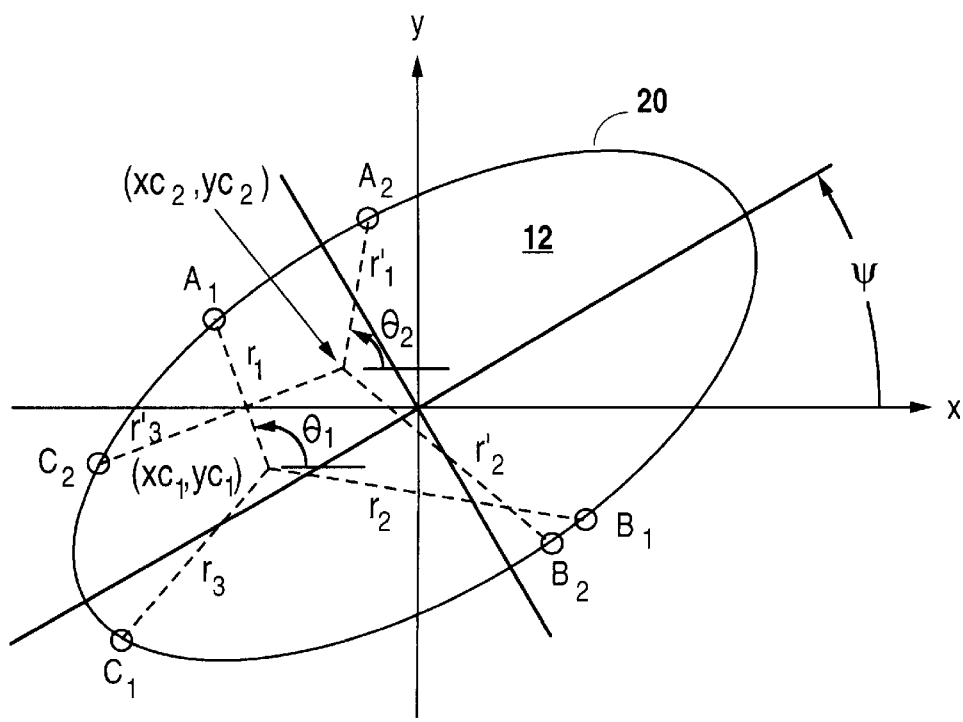
FIG. 3 is a graphical representation of distance and angle measurements made by an MWD tool in accordance with the present invention at two different tool locations within an earth borehole.

FIG. 3 depicts the distances $r_i$, angle θ, and tool center coordinates (xc,yc) for two sample firings of the tool 10 (not shown).

Figure 4A:
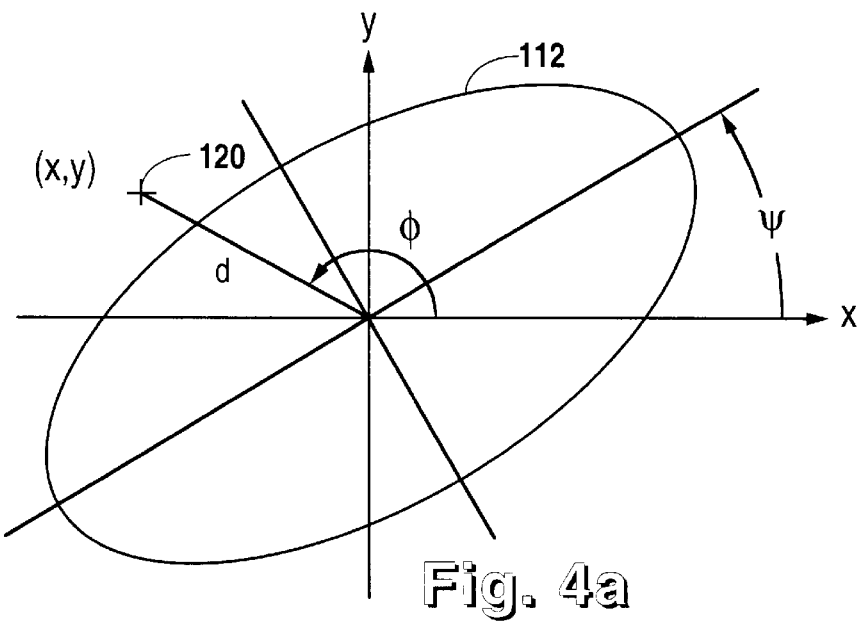
FIGS. 4a, 4b, and 4c are graphical views illustrating a coordinate transformation in accordance with the present invention.

Referring to FIGS. 3 and 4a, each of the measured points $A_n$, $B_n$, and $C_n$ on the borehole wall 20 may be defined with coordinates (x,y). In the parameter estimation process, an error function must be defined in order to compare the measured data points 120 to the estimated shape 112 of the borehole 12. Although the error function may be defined in any desirable way, a preferred error function is proportional to the distance between a measured point 120 and the estimated shape 112. A parameter optimization method is then used to minimize the error function in order to accurately estimate the shape. The Levenburg-Marquardt method is a preferred nonlinear least squares method that yields good results and has robustness at the initial estimate and quadratic convergence near the solution. The Levenburg-Marquardt method is disclosed by Gill et al. in "Practical Optimization," Academic Press, New York (1981), which is incorporated herein by reference. Nevertheless, other well known methods—such as neural networks, genetic algorithms, Monte Carlo methods, and simulated annealing—may also be used.

To that end, again referring to FIG. 4a, the distance d from the origin to an arbitrary point 120 having coordinates (x,y) is given by the following equation:

$$d = \sqrt{x^2 + y^2} \quad \text{Eq. [4]}$$

The angle φ between the reference direction x and a line from the origin to point (x,y) is given by the relation $$\phi = \tan^{-1}(y,x) \quad \text{Eq.[5]}$$

Figure 4B:
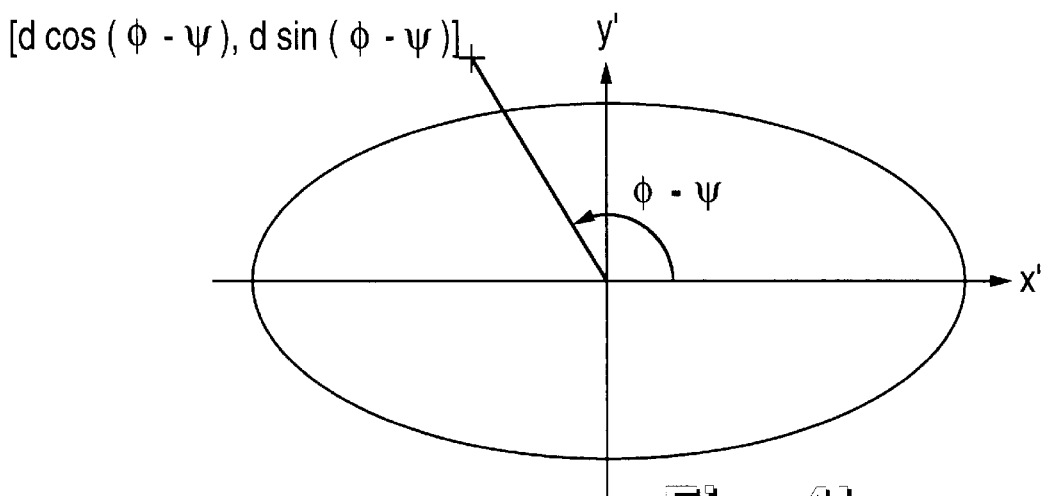
Figure 4C:
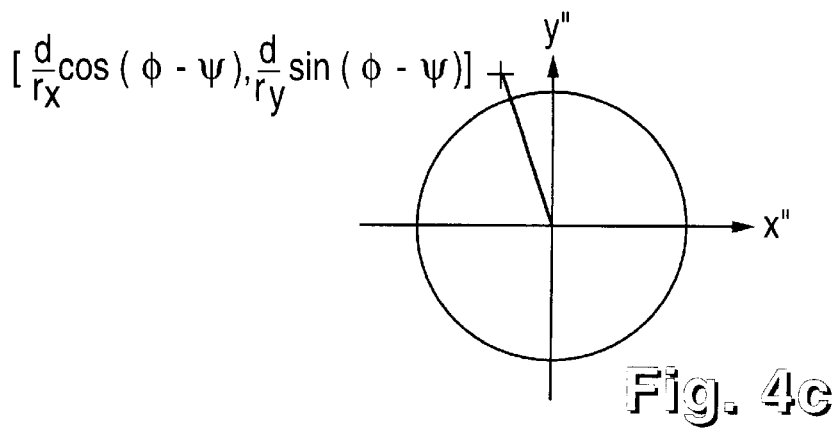

For ease of computation, the coordinates of each such point 120 are transformed from the (x,y) system into the (x",y") system as shown in FIGS. 4a, 4b, and 4c. The first step in the coordinate transformation is to rotate the axes by the angle $-\psi$ to align the axes of the ellipse with the coordinate axes (FIG. 4b). Then, the x and y coordinates are divided (scaled) by the ellipse major and minor radii, respectively, such that the ellipse becomes a unit circle (FIG. 4c). Thus, the transformed coordinates ($x_T,y_T$) in the (x",y") system are defined by the equation $$(x_T, y_T) = \left(\frac{d}{r_x}\cos(\phi - \psi), \frac{d}{r_y}\sin(\phi - \psi)\right) \quad \text{Eq. [6]}$$

The difference, or error, between the measured point and the estimated ellipse then becomes $$e = \sqrt{x_T^2 + y_T^2} - 1 \quad \text{Eq. [7]}$$

or $$e = \sqrt{\frac{d^2}{r_x^2}\cos^2(\phi - \psi) + \frac{d^2}{r_y^2}\sin^2(\phi - \psi)} - 1 \quad \text{Eq. [8]}$$

Substitution of Eqs. [4] and [5] into Eq. [8] and combining like terms yields the following error function for a single point:

$$e(x, y, r_x, r_y, \psi) = \quad \text{Eq. [9]}$$

$$\sqrt{(x^2 + y^2)\left[\frac{\cos^2(\tan^{-1}(y, x) - \psi)}{r_x^2} + \frac{\sin^2(\tan^{-1}(y, x) - \psi)}{r_y^2}\right]} - 1$$

In a preferred embodiment, the three acoustic transceivers 30 are spaced 120° apart circumferentially on the tool 10. Thus, the first transceiver 30 is at an angle θ, and the second and third transceivers 30 are at angles [θ+(2 π/3)] and [θ+(4 π/3)], respectively. Given this known sensor geometry and the measured distances $r_i$, the combined nonlinear least squares error function $E_n$ for each firing then becomes $$E_n(r_x, r_y, \psi, xc_n, yc_n, data_n) = \sum_{i=1}^{3} e_i^2(x_i, y_i, r_x, r_y, \psi) \quad \text{Eq. [10]}$$

$$= e^2((xc_n + r_1\cos(\theta)),$$
$$(yc_n + r_1\sin(\theta)), r_x, r_y, \psi) +$$
$$e^2\left(\left(xc_n + r_2\cos\left(\theta + \frac{2\pi}{3}\right)\right),\right.$$
$$\left.\left(yc_n + r_2\sin\left(\theta + \frac{2\pi}{3}\right)\right),\right.$$
$$r_x, r_y, \psi) +$$
$$e^2\left(\left(xc_n + r_3\cos\left(\theta + \frac{4\pi}{3}\right)\right),\right.$$
$$\left.\left(yc_n + r_3\sin\left(\theta + \frac{4\pi}{3}\right)\right), r_x, r_y, \psi\right)$$

where $r_i$ and θ are measured by the tool 10, $r_x$ and $r_y$ are the estimates of the major and minor radii of the ellipse, ψ is the estimate of the orientation angle of the ellipse, and (xc,yc) is the estimate of the location of the center of the tool 10. The overall error vector $\{E_T\}$ for N total firings is then given by the equation $$\{E_T\} = \{E_1, E_2, E_3, \ldots, E_N\} \quad \text{Eq. [11]}$$

The parameters to be estimated are contained in the parameter vector $\{X\}$ as follows:

$$\{X\} = \{r_x, r_y, \psi, xc_1, yc_1, xc_2, yc_2, \ldots, xc_N, yc_N\} \quad \text{Eq. [12]}$$

The parameter estimation process begins with an initial estimate for $\{X\}$. A reasonable initial estimate is to set $r_x$ and $r_y$ to the average of all the measured $r_i$ and set the remaining parameters to zero. The Levenburg-Marquardt method is then iteratively applied until the incremental change in the parameters falls below an acceptable threshold. Each iteration involves four steps: (1) computing the error vector $\{E_T\}$; (2) computing the Jacobian matrix [J], which is comprised of the partial derivatives of the error functions $E_n$ with respect to each estimated parameter; (3) computing the parameter adjustment vector $\{p\}$; and (4) updating the parameters $\{X\}$. The terms of the Jacobian matrix [J], which is a measure of the sensitivity of the error function to each estimated parameter, are defined as follows:

$$J_{m,n} = \frac{\partial E_n}{\partial X_m} \quad \text{Eq. [13]}$$

where $X_m$ denotes the various parameters comprising $\{X\}$, and n=1,2,3, ... N and m=1,2,3, ... 2N+3. The parameter adjustment vector $\{p\}$ is then calculated according to the equation $$\{p\} = -PseudoInverse([J]^T[J] + \lambda[I])([J]^T\{E_T\}) \quad \text{Eq. [14]}$$

where $[J]^T$ is the transpose of [J], λ is the Levenburg-Marquardt parameter that defines the step size for each iteration, [I] is the identity matrix, and $\{E_T\}$ is the value of the error function at the current parameter values. The parameters are then updated according to the relation $$\{X\} = \{X\} + \{p\} \quad \text{Eq. [15]}$$

and the process is repeated until the incremental change in the parameters falls below a specified threshold. Finally, convergence of the solution for $\{X\}$ is verified by ensuring that the terms of $\{E_T\}$ are below a similar specified threshold.

To perform these calculations, a properly programmed digital computer or microprocessor is very useful, particularly for calculating the partial derivatives comprising the terms of the Jacobian matrix [J]. Depending on the number of firings, each of the partial derivatives may contain hundreds of terms. A symbolic manipulator such as Mathematica® is a preferred means for performing these calculations. Table 1 contains sample Mathematica® code for generating the Jacobian matrix [J] and applying the Levenburg-Marquardt minimization technique.

Figures 7A, 7B:
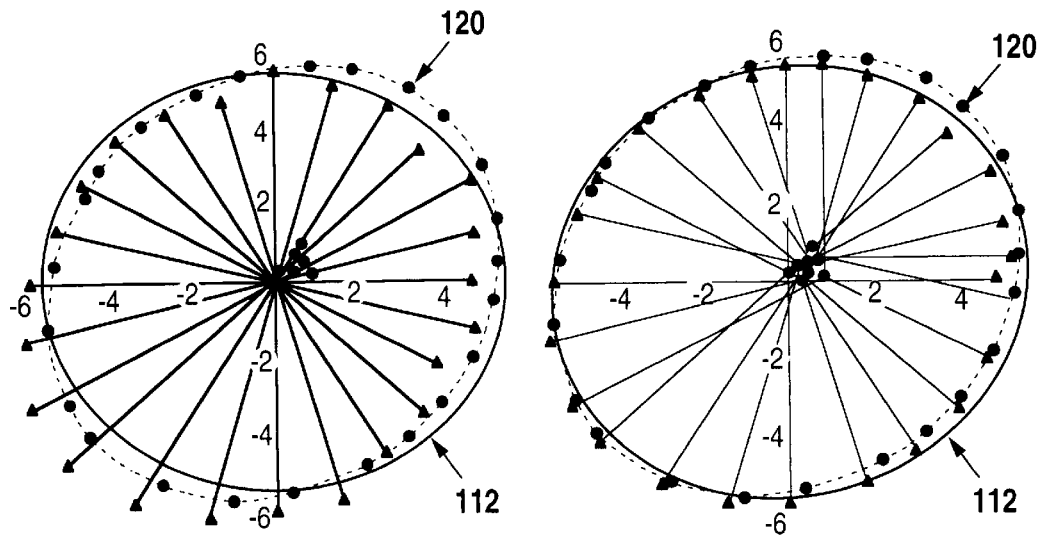
FIGS. 7a, 7b, 7c, and 7d are graphical views illustrating four nonconsecutive iterations of a parameter estimation process in accordance with the present invention.
Figures 7C, 7D:
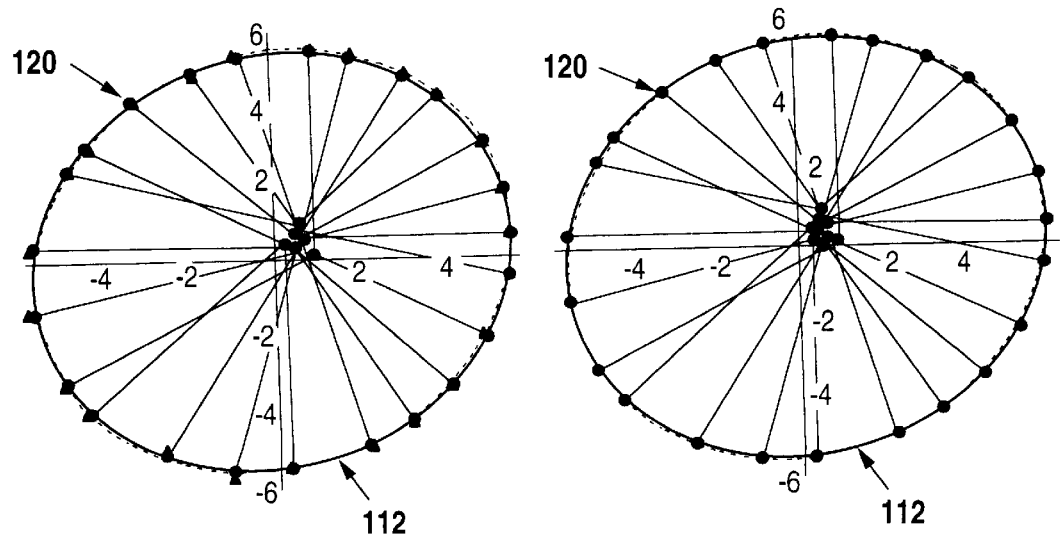

FIGS. 7a (iteration 1), 7b (iteration 5), 7c (iteration 10), and 7d (iteration 16) illustrate four nonconsecutive iterations of a sample parameter estimation process in accordance with the present invention. In those figures, the shape indicated by the solid line 112 is the shape defined by the estimation parameters $\{X\}$, and the points 120 connected by the dotted line represent the measured points on the borehole wall 20. As seen in these figures, the process yielded a close fit of the estimated shape 112 to the measured points 120 within sixteen iterations.

Solving for $\{X\}$ in the above manner defines (1) the shape and orientation of the borehole 12 and (2) the location and rotational orientation of the tool 10 within the borehole 12 at a plurality of times. In turn, that information allows the calculation of the lateral motion of the tool 10 within the borehole 12. Specifically, the lateral translational displacement $S_n$ is readily obtained according to the equation $$S_n = \sqrt{(xc_{n+1} - xc_n)^2 + (yc_{n+1} - yc_n)^2} \qquad \text{Eq. [16]}$$

Then, the lateral translational velocity $v_n$ and lateral translational acceleration $a_n$ are obtained by calculating the first and second derivatives, respectively, of $s_n$. Similarly, the rotational velocity $\omega$ and rotational acceleration $\alpha$ of the tool 10 are obtained by calculating the first and second derivatives, respectively, of the rotational displacement $\theta$ with respect to time. Such information regarding the tool motion is extremely valuable to drilling operators in order to adjust drilling parameters, such as weight on bit and drill string rotation speed, to avoid damaging motion such as bit whirl and thereby prolong the service life of the drill bit 22.

The method described above works well when measurement noise is negligible; however, in the presence of significant noise (e.g., 2% relative amplitude), the above method can in some cases greatly overestimate both ellipticity and tool motion. To obtain accurate estimates in the presence of measurement noise, the error function may be modified to include error terms proportional to the lateral translational displacement, $S_n$. By minimizing the estimated displacement, the modified method prevents overestimation of tool motion, which in turn prevents overestimation of ellipticity. The modified error vector is composed of the error vector of Eq. [11] appended with N-1 additional terms consisting of the translational displacement $S_n$ multiplied by a weighting coefficient:

$$\{E_T\}=\{E_1,E_1,\ldots,E_n, w\cdot s_1, w\cdot s_2 \ldots w\cdot s_{N-1}\} \qquad \text{Eq. [17]}$$

The weighting coefficient, w, should be large enough to prevent overestimation of tool motion when the noise amplitude is large and small enough to prevent underestimation of tool motion when noise is negligible. In practice, w is chosen such that the values of $(W\cdot S_n)$ are about the same order of magnitude as the values of $E_n$.

To further enhance the parameter estimation process, a plurality of accelerometers 80 (FIG. 1) may be used to provide additional data used to improve the accuracy of estimates of the tool center locations $(xc_n, yc_n)$. When the caliper data contains significant levels of noise, the solution $\{X\}$ can either be non-unique or can fit several shapes within a given upper bound on the error $\{E_T\}$. By supplementing the error $\{E_T\}$ with an additional error function using accelerometer data, constraints are imposed on the estimation of the locations $(xc_n,yc_n)$, which improves the uniqueness of the solution $\{X\}$. Specifically, the estimated tool location can be improved by concurrently minimizing both the error $\{E_T\}$ described above and either (1) the difference between center locations $(xc_n, yc_n)$ estimated from acoustic caliper measurements and those obtained from accelerometer measurements or (2) the difference between the lateral acceleration estimated from acoustic caliper measurements and the lateral acceleration estimated from accelerometer measurements.

Figure 5:
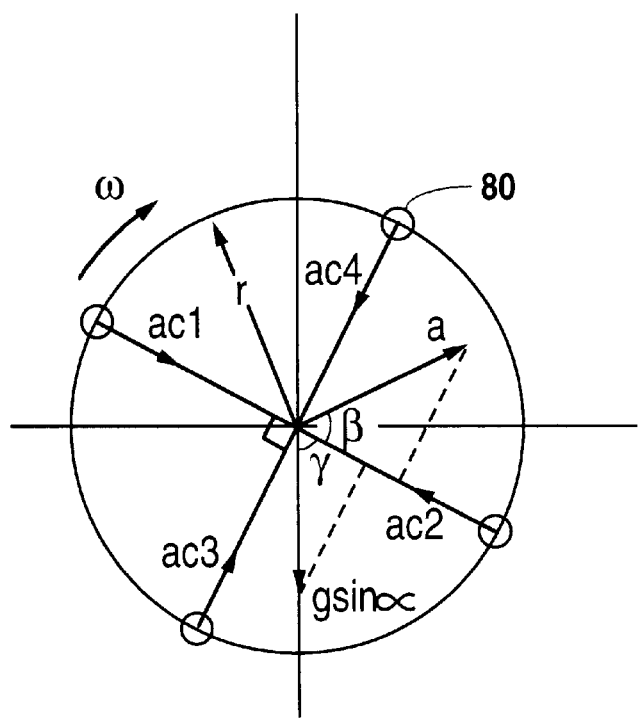
FIG. 5 is a schematic cross-sectional view showing the arrangement of accelerometers in an MWD tool in accordance with the present invention.

Referring to FIG. 5, a preferred embodiment of the present invention includes two pairs of accelerometers 80 located at the ends of two coplanar, orthogonal drill collar diameters. U.S. Pat. No. 4,958,125, issued Sep. 18, 1990, to Jardine et al., discloses a method and apparatus for determining characteristics of the movement of a rotating drill string, but the method for determining lateral acceleration in the '125 patent is directed to a vertical drill string orientation. Still referring to FIG. 5, for accelerometers oriented such that ac1 and ac2 are on one diameter and ac3 and ac4 are on an orthogonal diameter, the '125 patent sets forth equations of motion in the following form:

$$ac1 = ac + \alpha \cos \beta$$
$$ac2 = ac - \alpha \cos \beta$$
$$ac3 = ac + \alpha \sin \beta$$
$$ac4 = ac - \alpha \sin \beta \qquad \text{Eqs. [18]}$$

where ac is the centripetal acceleration, $\alpha$ is the lateral acceleration, and $\beta$ is the angle between the ac1/ac2 diameter and the lateral acceleration vector $\alpha$. From Eqs. [18], the '125 patent derives an expression for the magnitude of the lateral acceleration $\alpha$ in the following form:

$$\alpha = \{[(ac1-ac2)/(2)]^2 + [(ac3-ac4)/(2)]^2\}^{1/2} \qquad \text{Eq. [19]}$$

The direction of the lateral acceleration is determined by the following expression $$\tan \beta = (ac3-ac4)/(ac1-ac2) \qquad \text{Eq. [20]}$$

and the lateral acceleration a in vector form is $$a = \left(\frac{ac1-ac2}{2}, \frac{ac3-ac4}{2}\right) \qquad \text{Eq. [21]}$$

Obviously, Eqs. [18] do not contain any gravitational acceleration terms. Thus, Eqs. [18] correctly describe the tool motion only if the tool is oriented vertically such that the lateral component of the gravitational acceleration is zero.

Figure 6:
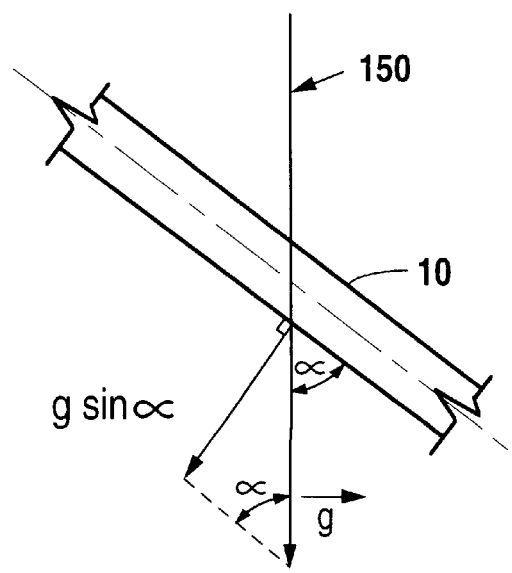
FIG. 6 is a schematic elevational view showing the gravitational acceleration of an MWD tool in accordance with the present invention when said tool is inclined with respect to the vertical.

To describe the tool motion accurately if the tool is in some general, inclined orientation, the equations of motion must include the gravitational acceleration terms as follows:

$$ac1 = ac + \alpha \cos \beta + g \sin \alpha \cos \gamma$$
$$ac2 = ac - \alpha \cos \beta - g \sin \alpha \cos \gamma$$
$$ac3 = ac + \alpha \cos \beta - g \sin \alpha \cos \gamma$$
$$ac4 = ac - \alpha \cos \beta + g \sin \alpha \cos \gamma \qquad \text{Eqs. [22]}$$

where g is the earth's gravitational constant (9.81 m/s$^2$), $\alpha$ is the inclination angle of the tool axis with respect to the vertical 150 (as shown in FIG. 6), and $\gamma$ is the angle between the ac1/ac2 diameter and the g sin a direction (as shown in FIG. 5). With the gravitational terms included, neither Eq. [19] nor Eq. [20] holds true for a general orientation of the tool axis. Thus, for a general orientation, another method is needed to determine the magnitude and direction of the lateral acceleration $\alpha$.

The present invention solves this complication caused by the presence of the gravitational acceleration terms in a general, inclined drill string orientation by incorporating a high-pass filter 90 (FIG. 1) to eliminate those terms. This solution is possible because the rotational frequencies of typical drilling speeds are well below the frequencies of the lateral accelerations of interest. Thus, the gravitational acceleration terms, which vary periodically at the frequency of the drill string rotation, can be safely eliminated without corrupting the lateral acceleration signals. After filtering in this manner, the governing equations of motion revert back to Eqs. [18], and Eqs. [19] and [20] may be used to determine the magnitude and direction of the lateral acceleration $\alpha$. The lateral velocity v may be calculated by integrating the lateral acceleration $\alpha$ once, and the lateral displacement s may be calculated by integrating the lateral acceleration $\alpha$ twice.

Figure 8:
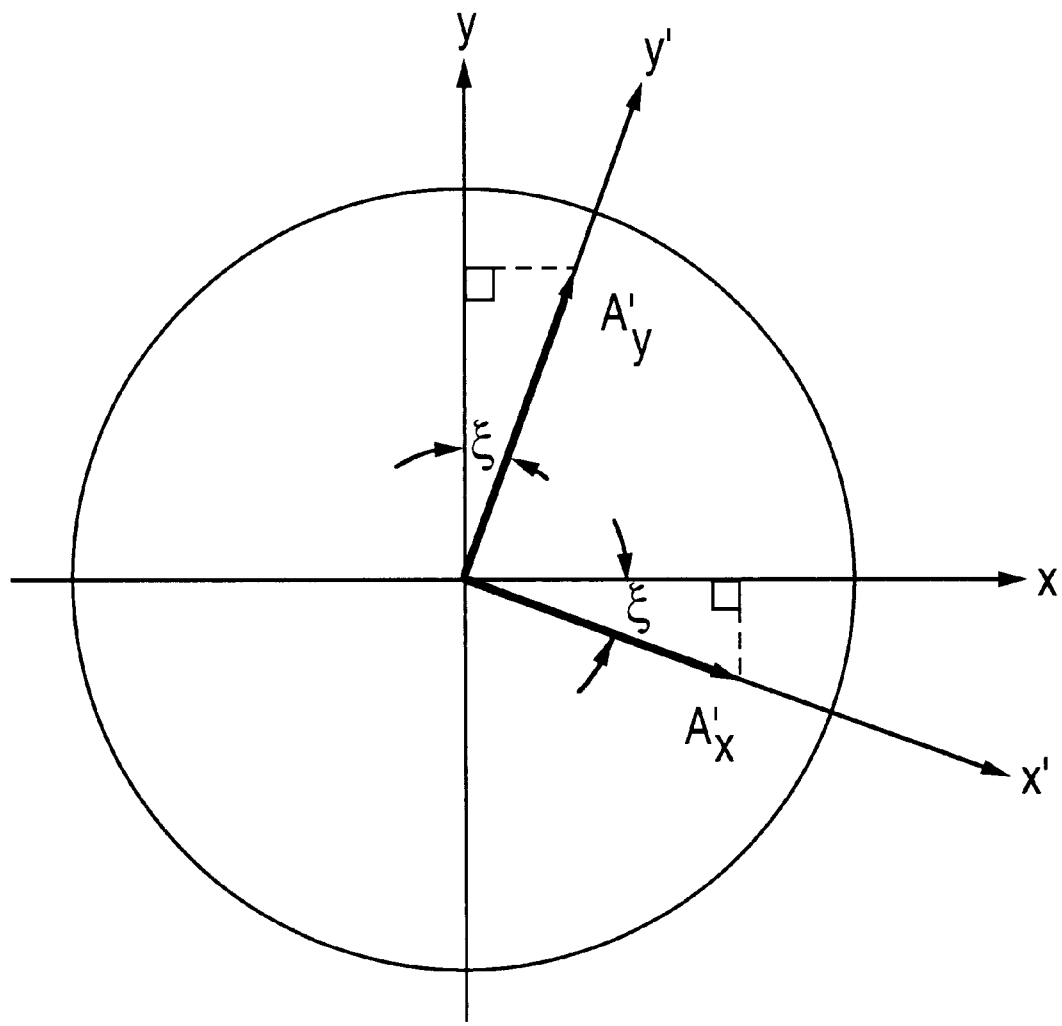
FIG. 8 is a schematic cross-sectional diagram showing a rotating coordinate system (x',y') and a fixed coordinate system (x,y) for the apparatus of FIG. 1.

Because the tool 10 is rotating, the initial measurement of the lateral acceleration $\alpha$ is with respect to a rotating coordinate system (x',y'), as shown in FIG. 8. However, the motion of the tool 10 is needed in the fixed reference frame of the borehole (earth). Thus, the lateral acceleration measurement must be converted to a fixed coordinate system (x,y) by way of a coordinate transformation. Referring to FIG. 8, the orthogonal components of the lateral acceleration $\alpha$ in the rotating coordinate system are represented as $A_x'$ and $A_y'$. The rotating coordinate system is rotationally displaced from the fixed coordinate system by an angle $\xi$. Therefore, the orthogonal components, $A_x$ and $A_y$, of the lateral acceleration $\alpha$ in the fixed coordinate system are calculated as follows:

$$A_x = A_x' \cos\xi + A_y' \sin\nu \qquad \text{Eq. [23]}$$

$$A_x = A_x' \sin\xi + A_y' \cos\nu \qquad \text{Eq. [24]}$$

The angle $\xi$ (in radians) is obtained from the following relation:

$$\xi = \xi_o + \omega t \qquad \text{Eq. [25]}$$

where $\xi_o$ is the initial value of the angle $\xi$, $\omega$ is the angular velocity (in radians/second) of the tool 10, and t is time (in seconds). Because the actual value of the initial condition, $\xi_o$, is not important for purposes of this invention, $\xi_o$ may be assumed to be zero. The angular velocity $\omega$ is readily calculated by computing the time rate of change in the angle $\theta$ (FIG. 2). After converting the lateral acceleration $\alpha$ into the fixed reference frame, the signal processor 50 is then used to integrate the lateral acceleration $\alpha$ once to obtain the tool's lateral velocity v, and twice to obtain the tool's lateral displacement s.

The lateral acceleration $a_n$ and lateral velocity $v_n$ at time $t_n$ for tool center location ($xc_n, yc_n$) are then used to specify a region in which the next tool center location ($xc_{n+1}, yc_{n+1}$) must fall at time $t_{n+1}$. Assuming that the lateral acceleration $\alpha$ is constant between times $t_n$ and $t_{n+1}$, the distance $S_n$ through which the tool center would travel over that time span is approximated by the equation $$S_n = (V_n)(t_{n+1}-t_n) + (\tfrac{1}{2})(\alpha_n)(t_{n+1}-t_n)^2 \qquad \text{Eq. [26]}$$

The distance $s_n$ will be in the direction determined according to Eq. [20]. In Eq. [17], additional elements of the error vector are defined in terms of the displacement $s_n$ derived from the acoustic calipers. In a similar fashion, additional elements of the error vector may be defined in terms of the difference between the displacements $s_n$ and $s_n'$ derived from the acoustic calipers and the accelerometers, respectively:

$$F_n = W_s|S_n - S_n'| \qquad \text{Eq. [27]}$$

$$\{E_T\} = \{E_1, E_1, \ldots E_N, F_1, F_2 \ldots F_{N-1}\} \qquad \text{Eq. [28]}$$

Again, the weighting coefficient $W_s$ is chosen such that the $F_n$ terms are generally no larger than the $E_n$ terms at nominal measurement noise levels. The point defined in this manner is then given a tolerance to define a region in which to constrain the location of the subsequent tool center location ($xc_{n+1}, yc_{n+1}$).

The estimated tool location may also be improved by concurrently minimizing $\{E_T\}$ determined according to Eq. [11] and a supplemental error vector that is the weighted difference between the lateral accelerations $\alpha_n$ and $\alpha'_n$ estimated from acoustic caliper measurements and accelerometer measurements, respectively. A lateral translation acceleration vector can be derived from the locations ($xc_n, yc_n$) using the following second order finite difference formula $$a_n' = \left(\frac{1}{t_{n+1}-t_{n-1}}\right)((x_{n+1}-2x_n+x_{n-1}),(y_{n+1}-2y_n+y_{n-1})) \qquad \text{Eq. [29]}$$

and the magnitude of the difference between the acceleration estimates is $$|a_n - a_n'| = \frac{1}{(t_{n+1}-t_{n-1})^2}\sqrt{\left(xc_{n+1}-2xc_n+xc_{n-1}-\frac{(ac1-ac2)}{2}\right)^2 + \left(yc_{n+1}-2yc_n+yc_{n-1}-\frac{(ac3-ac4)}{2}\right)^2} \qquad \text{Eq. [30]}$$

The supplemental error vector $\{F_T\}$ is defined as follows:

$$\{F_T\} = \{F_1, F_2, F_3, \ldots, F_N\} \qquad \text{Eq. [31]}$$

and the terms of $\{F_T\}$, which are the weighted differences of the accelerations, are obtained according to the relation $$F_n = W_a|a_n - a_n'| \qquad \text{Eq. [32]}$$

where $W_a$ is a weighting (scaling) factor chosen such that the size of the error for the accelerometer data is no greater than that for the acoustic caliper data. An augmented error vector $\{E_T\}$ is then defined by the concatenation of $\{E_T\}$ from Eq. [11] and $\{F_T\}$ from Eq. [31] as follows:

$$\{E_T\} = \{E_1, E_2, \ldots, E_N, F_1, F_2, F_3, \ldots, F_N\} \qquad \text{Eq. [33]}$$

By minimizing $\{E_T\}$, this invention concurrently estimates the borehole shape and minimizes the difference between the lateral acceleration derived from acoustic caliper measurements and the lateral acceleration derived from accelerometer measurements.

In a similar fashion, additional error elements may be defined in terms of higher order derivatives of the tool motion. The derivatives can be formulated in terms of finite differences and may use interpolation methods and other numerical differentiation methods. The first and mth order finite differences may be defined as follows:

$$D^1[x_n] = x_{n+1} - x_n \qquad \text{Eq. [34]}$$

$$D^{m+1}[x_n] = D^m[x_{n+1}] - D^m[x_n] \qquad \text{Eq. [35]}$$

The mth order error term may be defined in terms of the difference between the mth order finite differences of displacement $D^m[S_n]$ and $D^m[S'_n]$ for the acoustic calipers and accelerometers, respectively:

$$F_n^m = W|D^m[S_n] - D^m[S'_n]| \qquad \text{Eq. [36]}$$

$$\{E_T^n\} = \{E_1, E_1, \ldots E_N, F_2^n, \ldots, F_{N-1}^n\} \qquad \text{Eq. [37]}$$

All of the required calculations discussed above are performed by signal processor 50, which preferably comprises a properly programmed microprocessor, digital signal processor, or digital computer.

Although the above discussion pertains to the estimation of an elliptically shaped borehole, persons reasonably skilled in the art of petroleum well drilling and logging will recognize that more complex shapes may also be estimated according to the method of this invention by specifying appropriate parameters to define the more complex shapes. For example, a borehole shape corresponding to an Oval of Cassini defined by the formula $$(x^2+y^2+b^2)-4b^2x^2=k^2 \qquad \text{Eq. [38]}$$

could be estimated by specifying the parameters b and k, where b<k.

Finally, although the foregoing specific details describe a preferred embodiment of this invention, persons reasonably skilled in the art of petroleum well drilling and logging will recognize that various changes may be made in the details of the method and apparatus of this invention without departing from the spirit and scope of the invention as defined in the appended claims. Therefore, it should be understood that this invention is not to be limited to the specific details shown and described herein.

We claim:

1. An apparatus for estimating the actual cross-sectional shape and orientation of an earth borehole comprising:
   (a) a rotatable tool having
      (1) a plurality of distance sensors for generating standoff signals representative of respective standoff distances from each of said distance sensors to respective points on the wall of a borehole at a plurality of measurement times, and
      (2) at least one angle sensor for generating rotational orientation signals representative of the rotational orientation angle of said tool with respect to a reference direction at said plurality of measurement times; and
   (b) a signal processor for calculating an estimate of the actual cross-sectional shape and orientation of an earth borehole based on said standoff signals and said rotational orientation signals.

2. The apparatus of claim 1 wherein said signal processor is mounted to said tool.

3. The apparatus of claim 2 wherein said tool further comprises a data storage device in communication with said signal processor.

4. The apparatus of claim 3 wherein said data storage device stores data representative of said standoff distances and said rotational orientation angles.

5. The apparatus of claim 3 wherein said data storage device stores data representative of said estimate.

6. The apparatus of claim 2 wherein said tool further comprises a data transmitter in communication with said signal processor.

7. The apparatus of claim 6 wherein said data transmitter transmits said standoff signals and said rotational orientation signals to the earth's surface.

8. The apparatus of claim 6 wherein said data transmitter transmits signals representative of said estimate to the earth's surface.

9. The apparatus of claim 1 wherein said signal processor is located at the earth's surface.

10. The apparatus of claim 9 wherein said tool further comprises a data storage device.

11. The apparatus of claim 10 wherein said data storage device stores data representative of said standoff distances and said rotational orientation angles.

12. The apparatus of claim 9 wherein said tool further comprises a data transmitter.

13. The apparatus of claim 12 wherein said data transmitter transmits said standoff signals and said rotational orientation signals to the earth's surface.

14. The apparatus of claim 1 wherein said distance sensors are selected from the group consisting of acoustic calipers, mechanical calipers, and electrical resistance sensors.

15. The apparatus of claim 1 wherein said plurality of distance sensors comprises three such distance sensors equally spaced around said tool.

16. The apparatus of claim 1 wherein said at least one angle sensor comprises at least one gravitational sensor for indicating the angular orientation of said tool with respect to the direction of the earth's gravity.

17. The apparatus of claim 16 wherein said at least one gravitational sensor is selected from the group consisting of accelerometers, inclinometers, and gyroscopes.

18. The apparatus of claim 1 wherein said at least one angle sensor comprises at least one magnetic sensor for indicating the angular orientation of said tool with respect to the direction of the earth's magnetic field.

19. The apparatus of claim 18 wherein said at least one magnetic sensor comprises a magnetometer.

20. The apparatus of claim 1 wherein said signal processor calculates said estimate of the actual cross-sectional shape and orientation of an earth borehole by
   (a) receiving said standoff signals and said rotational orientation signals,
   (b) generating parameter signals representative of a set of parameters that defines an estimated cross-sectional shape and orientation of the borehole and an estimated position of said tool within the borehole at each of said measurement times,
   (c) combining said standoff signals, said rotational orientation signals, and said parameter signals to generate primary error signals representative of a primary error function proportional to the difference between said estimated cross-sectional shape and the actual cross-sectional shape of the borehole,
   (d) combining said parameter signals and said primary error signals to generate sensitivity signals representative of the sensitivity of said primary error function to each of said parameters, and
   (e) adjusting said parameter signals based on said sensitivity signals to minimize said primary error function and thereby determine optimal values for said parameters.

21. The apparatus of claim 20 wherein said signal processor performs the further function of generating translational displacement signals representative of the lateral translational displacement $s_n$ of said tool according to the equation $$s_n = \sqrt{(xc_{n+1} - xc_n)^2 + (yc_{n+1} - yc_n)^2}$$

wherein $(xc_n, yc_n)$ and $(xc_{n+1}, yc_{n+1})$ are the coordinates of said estimated position of said tool within the borehole at two successive said measurement times.

22. The apparatus of claim 21 wherein said signal processor performs the further function of generating translational velocity signals representative of the lateral translational velocity of said tool by calculating the first derivative of said lateral translational displacement with respect to time.

23. The apparatus of claim 21 wherein said signal processor performs the further function of generating translational acceleration signals representative of the lateral translational acceleration of said tool by calculating the second derivative of said lateral translational displacement with respect to time.

24. The apparatus of claim 20 wherein said signal processor performs the further function of generating rotational displacement signals representative of the rotational displacement θ of said tool according to the equation $$\theta = \theta_{n+1} - \theta_n$$

wherein $\theta_n$ and $\theta_{n+1}$ are said rotational orientation signals of said tool at two successive said measurement times.

25. The apparatus of claim 24 wherein said signal processor performs the further function of generating rotational velocity signals representative of the rotational velocity of said tool by calculating the first derivative of said rotational displacement with respect to time.

26. The apparatus of claim 24 wherein said signal processor performs the further function of generating rotational acceleration signals representative of the rotational acceleration of said tool by calculating the second derivative of said rotational displacement with respect to time.

27. The apparatus of claim 20 wherein said signal processor performs the further functions of generating supplemental error signals representative of a supplemental error function proportional to the motion of said tool, combining said parameter signals and said supplemental error signals to generate supplemental sensitivity signals representative of the sensitivity of said supplemental error function to each of said parameters, and adjusting said parameter signals based on said supplemental sensitivity signals to minimize said supplemental error function.

28. The apparatus of claim 27 wherein:
said signal processor performs the further function of generating translational displacement signals representative of the lateral translational displacement $s_n$ of said tool according to the equation $$s_n = \sqrt{(xc_{n+1} - xc_n)^2 + (yc_{n+1} - yc_n)^2}$$

wherein $(xc_n, yc_n)$ and $(xc_{n+1}, yc_{n+1})$ are the coordinates of said estimated position of said tool within the borehole at two successive said measurement times; and
the terms of said supplemental error function are defined using said translational displacement signals according to the equation $$F_n = W \cdot s_n$$

wherein W is a weighting coefficient and $s_n$ is the lateral translational displacement of said tool at each of said measurement times.

29. The apparatus of claim 27 further comprising:
a plurality of accelerometers mounted to said tool for generating raw acceleration signals proportional to the lateral translational acceleration of said tool;
a filter mounted to said tool in communication with said plurality of accelerometers for receiving said raw acceleration signals, filtering out the contribution of gravity to said raw acceleration signals, and generating filtered acceleration signals proportional to the lateral translational acceleration of said tool in a rotating reference frame of said tool;
wherein said signal processor performs the further functions of receiving said filtered acceleration signals, transforming said filtered acceleration signals and thereby generating transformed acceleration signals proportional to the lateral translational acceleration of said tool in a fixed reference frame of the earth, and combining said transformed acceleration signals and thereby generating measured acceleration signals representative of the lateral translational acceleration of said tool;
wherein said signal processor performs the further functions of generating translational displacement signals representative of the lateral translational displacement $s_n$ of said tool derived from said standoff signals from said distance sensors according to the equation $$s_n = \sqrt{(xc_{n+1} - xc_n)^2 + (yc_{n+1} - yc_n)^2}$$

wherein $(xc_n, yc_n)$ and $(xc_{n+1}, yc_{n+1})$ are the coordinates of said estimated position of said tool within the borehole at two successive said measurement times, and generating derived acceleration signals representative of the lateral translational acceleration of said tool by calculating the second derivative of said lateral translational displacement with respect to time; and
wherein the terms of said supplemental error function are defined according to the equation $$F_n = W_a |a_n - a_n'|$$

wherein $W_a$ is a weighting coefficient, $a_n$ is the value of said derived acceleration signal for each of said measurement times, and $a_n'$ is the value of said measured acceleration signal for each of said measurement times.

30. The apparatus of claim 27 further comprising:
a plurality of accelerometers mounted to said tool for generating raw acceleration signals proportional to the lateral translational acceleration of said tool;
a filter mounted to said tool in communication with said plurality of accelerometers for receiving said raw acceleration signals, filtering out the contribution of gravity to said raw acceleration signals, and generating filtered acceleration signals proportional to the lateral translational acceleration of said tool in a rotating reference frame of said tool;
wherein said signal processor performs the further functions of receiving said filtered acceleration signals, transforming said filtered acceleration signals and thereby generating transformed acceleration signals proportional to the lateral translational acceleration of said tool in a fixed reference frame of the earth, combining said transformed acceleration signals and thereby generating measured acceleration signals representative of the lateral translational acceleration of said tool, and generating derived displacement signals representative of the lateral translational displacement of said tool by twice integrating said measured acceleration signals;
wherein said signal processor performs the further function of generating measured displacement signals representative of the lateral translational displacement $s_n$ of said tool obtained from said standoff signals from said distance sensors according to the equation $$s_n = \sqrt{(xc_{n+1} - xc_n)^2 + (yc_{n+1} - yc_n)^2}$$

wherein $(xc_n, yc_n)$ and $(xc_{n+1}, yc_{n+1})$ are the coordinates of said estimated position of said tool within the borehole at two successive said measurement times; and wherein the terms of said supplemental error function are defined according to the equation $$F_n = W_s |s_n - s_n'|$$

wherein $W_s$ is a weighting coefficient, $s_n$ is the value of said measured displacement signal for each of said measurement times, and $s_n'$ is the value of said derived displacement signal for each of said measurement times.

31. The apparatus of claim 27 further comprising:
   a plurality of accelerometers mounted to said tool for generating raw acceleration signals proportional to the lateral translational acceleration of said tool;
   a filter mounted to said tool in communication with said plurality of accelerometers for receiving said raw acceleration signals, filtering out the contribution of gravity to said raw acceleration signals, and generating filtered acceleration signals proportional to the lateral translational acceleration of said tool in a rotating reference frame of said tool;
   wherein said signal processor performs the further functions of receiving said filtered acceleration signals, transforming said filtered acceleration signals and thereby generating transformed acceleration signals proportional to the lateral translational acceleration of said tool in a fixed reference frame of the earth, combining said transformed acceleration signals and thereby generating measured acceleration signals representative of the lateral translational acceleration of said tool, and generating derived displacement signals representative of the lateral translational displacement of said tool by twice integrating said measured acceleration signals;
   wherein said signal processor performs the further function of generating measured displacement signals representative of the lateral translational displacement $s_n$ of said tool obtained from said standoff signals from said distance sensors according to the equation $$s_n = \sqrt{(xc_{n+1} - xc_n)^2 + (yc_{n+1} - yc_n)^2}$$

wherein $(xc_n, yc_n)$ and $(xc_{n+1}, yc_{n+1})$ are the coordinates of said estimated position of said tool within the borehole at two successive said measurement times; and
   wherein the terms of said supplemental error function are defined according to the equation $$F_n = W_d |D'''[s_n] - D'''[s_n']|$$

wherein $W_d$ is a weighting coefficient, $D'''[s_n]$ is an mth order finite difference of said measured displacement signals, and $D'''[S_n']$ is an mth order finite difference of said derived displacement signals.

32. The apparatus of any one of claims 29, 30, and 31 wherein:
   said plurality of accelerometers comprises four accelerometers ac1, ac2, ac3, and ac4 mounted at the ends of a first diameter of said tool and a second diameter of said tool, with said first diameter being orthogonal to said second diameter, such that accelerometers ac1 and ac2 are on said first diameter and accelerometers ac3 and ac4 are on said second diameter, with said accelerometers ac1, ac2, ac3, and ac4 producing electrical signals a1, a2, a3, and a4, respectively, according to the equations $$a1 = ac + \alpha \cos \beta + g \sin \alpha \cos \gamma$$

$$a2 = ac - \alpha \cos \beta - g \sin \alpha \cos \gamma$$

$$a3 = ac + \alpha \sin \beta - g \sin \alpha \sin \gamma$$

$$a1 = ac - \alpha \sin \beta + g \sin \alpha \sin \gamma$$

wherein $ac$ is the centripetal acceleration of said tool, $\alpha$ is said lateral translational acceleration of said tool, $\beta$ is the angle between said first diameter and the direction of said lateral translational acceleration, g is the earth's gravitational constant, $\alpha$ is the inclination angle of said tool with respect to the vertical, and $\gamma$ is the angle between said first diameter and the direction of the in-plane component of gravity, $g \sin \alpha$;
   said filter comprises a high-pass filter through which said electrical signals a1, a2, a3, and a4 are filtered to produce filtered signals fa1, fa2, fa3, and fa4, respectively, according to the equations $$fa1 = ac + \alpha \cos \beta$$

$$fa2 = ac - \alpha \cos \beta$$

$$fa3 = ac + \alpha \sin \beta$$

$$fa4 = ac - \alpha \sin \beta$$

wherein said signal processor performs the further functions of receiving said filtered signals fa1, fa2, fa3, and fa4 and combining said filtered signals to generate magnitude and direction signals, respectively, representative of the lateral translational acceleration of said tool in a rotating reference frame of said tool according to the equations $$\alpha = \{[(fa1-fa2)/(2)]^2 + [(fa3-fa4)/(2)]^2\}^{1/2}$$

$$\tan \beta = (fa3-fa4)/(fa1-fa2).$$

33. An apparatus for estimating the actual cross-sectional shape and orientation of an earth borehole comprising:
   a rotating tool having a radius $r_t$;
   three acoustic sensors mounted to said tool at three sensor locations equally spaced around the circumference of said tool for generating standoff signals representative of standoff distances $d_1$, $d_2$, and $d_3$, respectively, between said three sensor locations on said tool and corresponding measured points $P_1$, $P_2$, and $P_3$ on the wall of the borehole at each of a plurality of measurement times;
   a gravitational sensor mounted to said tool for generating first rotational orientation signals representative of the rotational orientation angle of said tool with respect to a first reference direction of the earth's gravity at each of said measurement times;
   a magnetic sensor mounted to said tool for generating second rotational orientation signals representative of the rotational orientation angle of said tool with respect to a second reference direction of the earth's magnetic field at each of said measurement times;
   a signal processor mounted to said tool in communication with said acoustic sensors, said gravitational sensor, and said magnetic sensor for
      receiving said standoff signals, said first rotational orientation signals, and said second rotational orientation signals,
      generating radius signals representative of distances $r_1$, $r_2$, and $r_3$, respectively, from the center of said tool to said measured points $P_1$, $P_2$, and $P_3$ on the wall of the borehole using said standoff signals according to the equations $r_1 = d_1 + r_t$ $r_2 = d_2 + r_t$ $r_3 = d_3 + r_t$ at each of said measurement times, comparing said first and second rotational orientation signals and selecting one of said first or second rotational orientation signals as a primary rotational orientation signal representative of an angle θ with respect to a primary reference direction at each of said measurement times, generating parameter signals representative of a parameter vector {X} comprised of parameters $X_m$ that defines an estimated ellipse to approximate the cross-sectional shape and orientation of the borehole and an estimated position of said tool within the borehole at each of said measurement times according to the following equation $\{X\} = \{r_x, r_y, \psi, xc_1, xc_2, yc_1, yc_2, \ldots, xc_N, yc_N\}$ wherein $r_x$ is the major radius of said ellipse, $r_y$ is the minor radius of said ellipse, ψ is the angle between said major radius and said primary reference direction, and $(xc_n, yc_n)$ are the coordinates of the center of said tool within the borehole at said estimated position at each of said measurement times, generating point error signals representative of a point error function e for each of said measured points according to the following equation $$e(x, y, r_x, r_y, \psi) = \sqrt{(x^2 + y^2)\left[\frac{\cos^2(\tan^{-1}(y, x) - \psi)}{r_x^2} + \frac{\sin^2(\tan^{-1}(y, x) - \psi)}{r_y^2}\right] - 1}$$

wherein (x, y) are the coordinates of said measured points for each of said measurement times, combining said point error signals and generating firing error signals representative of a firing error function $E_n$ for each of said measurement times according to the equation $$E_n(r_x, r_y, \psi, xc_n, yc_n, data_n) = \sum_{i=1}^{3} e_i^2(x_i, y_i, r_x, r_y, \psi) = e^2((xc_n + r_1\cos(\theta)), (yc_n + r_1\sin(\theta)), r_x, r_y, \psi) +$$

$$e^2\left(\left(xc_n + r_2\cos\left(\theta + \frac{2\pi}{3}\right)\right), \left(yc_n + r_2\sin\left(\theta + \frac{2\pi}{3}\right)\right), r_x, r_y, \psi\right) +$$

$$e^2\left(\left(xc_n + r_3\cos\left(\theta + \frac{4\pi}{3}\right)\right), \left(yc_n + r_3\sin\left(\theta + \frac{4\pi}{3}\right)\right), r_x, r_y, \psi\right),$$

generating primary error signals representative of a primary error function $\{E_T\}$ according to the equation $\{E_T\} = \{E_1, E_2, E_3, \ldots, E_N\}$ wherein the terms $E_n$ represent said firing error signals at each of said measurement times, using said parameter signals and said primary error signals to generate sensitivity signals representative of the Jacobian matrix [J] as a measure of the sensitivity of said primary error function $\{E_T\}$ to each of said parameters $X_m$ according to the equation $$J_{m,n} = \frac{\partial E_n}{\partial X_m}$$

wherein n=1,2,3, . . . ,N and m=1,2,3, . . . ,2N+3, using said sensitivity signals and said primary error signals to generate parameter adjustment signals representative of a parameter adjustment vector {p} according to the equation $\{p\} = -\text{PseudoInverse}([J]^T[J] + \lambda[J])([J]^T\{E_T\})$ wherein $[J]^T$ is the transpose of the Jacobian matrix [J], λ is a Levenburg-Marquardt parameter, and [I] is the identity matrix, using said parameter adjustment signals to iteratively adjust said parameters according to the relation $\{X\} = \{X\} + \{p\}$ to minimize said primary error function, and generating solution signals representative of optimal values for said parameters.

34. The apparatus of claim 33 wherein said tool further comprises a data storage device in communication with said signal processor.

35. The apparatus of claim 34 wherein said data storage device stores data representative of said standoff distances and said rotational orientation angles.

36. The apparatus of claim 34 wherein said data storage device stores data representative of said optimal values for said parameters.

37. The apparatus of claim 33 wherein said tool further comprises a data transmitter in communication with said signal processor.

38. The apparatus of claim 37 wherein said data transmitter transmits said standoff signals and said first and second rotational orientation signals to the earth's surface.

39. The apparatus of claim 37 wherein said data transmitter transmits said solution signals to the earth's surface.

40. The apparatus of claim 33 further comprising:

four accelerometers ac1, ac2, ac3, and ac4 mounted at the ends of a first diameter of said tool and a second diameter of said tool, with said first diameter being orthogonal to said second diameter, such that accelerometers ac1 and ac2 are on said first diameter and accelerometers ac3 and ac4 are on said second diameter, with said accelerometers ac1, ac2, ac3, and ac4 producing electrical signals a1, a2, a3, and a4, respectively, according to the equations $a1 = \alpha_c + \alpha \cos\beta + g \sin\alpha \cos\gamma$ $a2 = \alpha_c - \alpha \cos\beta - g \sin\alpha \cos\gamma$ $a3 = \alpha_c + \alpha \sin\beta - g \sin\alpha \sin\gamma$ $a4 = \alpha_c - \alpha \sin\beta + g \sin\alpha \sin\gamma$ wherein $\alpha_c$ is the centripetal acceleration of said tool, α is the lateral translational acceleration of said tool, β is the angle between said first diameter and the direction of said lateral translational acceleration, g is the earth's gravitational constant, α is the inclination angle of said tool with respect to the vertical, and γ is the angle between said first diameter and the direction of the in-plane component of gravity, g sin α; and a high-pass filter through which said electrical signals a1, a2, a3, and a4 are filtered to produce filtered signals fa1, fa2, fa3, and fa4, respectively, according to the equations $$fa1 = ac + \alpha \cos \beta$$
$$fa2 = ac - \alpha \cos \beta$$
$$fa3 = ac + \alpha \sin \beta$$
$$fa4 = ac - \alpha \sin \beta$$

wherein said signal processor performs the further functions of receiving said filtered signals fa1, fa2, fa3, and fa4 and combining said filtered signals to generate acceleration magnitude signals and acceleration direction signals, respectively, representative of the lateral translational acceleration of said tool in a rotating reference frame of said tool according to the equations $$\alpha = \{[(fa1-fa2)/(2)]^2 + [(fa3-fa4)/(2)]^2\}^{1/2}$$
$$\tan \beta = (fa3-fa4)/(fa1-fa2),$$

transforming said acceleration magnitude signals and said acceleration direction signals and thereby generating transformed acceleration signals proportional to the lateral translational acceleration of said tool in a fixed reference frame of the earth, combining said transformed acceleration signals and thereby generating measured acceleration signals representative of the lateral translational acceleration of said tool at each of said measurement times, generating derived acceleration signals representative of the lateral translational acceleration of said tool at each of said measurement times according to the equation $$a'_n = \left(\frac{1}{t_{n+1} - t_{n-1}}\right)((xc_{n+1} - 2xc_n + xc_{n-1}), (yc_{n+1} - 2yc_n + yc_{n-1}))$$

wherein $(xc_{n-1}, yc_{n-1})$, $(xc_n, yc_n)$, and $(xc_{n+1}, yc_{n+1})$ are the coordinates of said estimated position of said tool within the borehole at three successive said measurement times $t_{n-1}, t_n$, and $t_{n+1}$, respectively, generating difference signals representative of the magnitude of the difference between said derived acceleration signals and said measured acceleration signals according to the equation $$|a_n - a'_n| = \frac{1}{(t_{n+1} - t_{n-1})^2} \sqrt{\left(xc_{n+1} - 2xc_n + xc_{n-1} - \frac{(fa1 - fa2)}{2}\right)^2 + \left(yc_{n+1} - 2yc_n + yc_{n-1} - \frac{(fa3 - fa4)}{2}\right)^2}$$

generating supplemental error signals representative of a supplemental error function $\{F_T\}$ according to the equation $$\{F_T\} = \{F_1, F_2, F_3, \ldots, F_N\}$$

wherein the terms $F_n$ comprising $\{F_T\}$ are defined according to the equation $$F_n = W|a'_n - a_n|$$

wherein W is a weighting factor, combining said parameter signals and said supplemental error signals to generate supplemental sensitivity signals representative of the sensitivity of said supplemental error function to each of said parameters, and adjusting said parameter signals based on said supplemental sensitivity signals to minimize said supplemental error function.

41. An apparatus for estimating the actual motion of a tool within an earth borehole comprising:

(b) a rotatable tool having
(1) a plurality of distance sensors for generating standoff signals representative of respective standoff distances from each of said distance sensors to respective points on the wall of a borehole at a plurality of measurement times, and
(2) at least one angle sensor for generating rotational orientation signals representative of the rotational orientation angle of said tool with respect to a reference direction at said plurality of measurement times; and (b) a signal processor for calculating an estimate of the lateral motion of said tool within an earth borehole based on said standoff signals and said rotational orientation signals.

42. The apparatus of claim 41 wherein said signal processor is mounted to said tool.

43. The apparatus of claim 42 wherein said tool further comprises a data storage device in communication with said signal processor.

44. The apparatus of claim 43 wherein said data storage device stores data representative of said standoff distances and said rotational orientation angles.

45. The apparatus of claim 43 wherein said data storage device stores data representative of said estimate.

46. The apparatus of claim 42 wherein said tool further comprises a data transmitter in communication with said signal processor.

47. The apparatus of claim 46 wherein said data transmitter transmits said standoff signals and said rotational orientation signals to the earth's surface.

48. The apparatus of claim 46 wherein said data transmitter transmits signals representative of said estimate to the earth's surface.

49. The apparatus of claim 41 wherein said signal processor is located at the earth's surface.

50. The apparatus of claim 49 wherein said tool further comprises a data storage device.

51. The apparatus of claim 50 wherein said data storage device stores data representative of said standoff distances and said rotational orientation angles.

52. The apparatus of claim 49 wherein said tool further comprises a data transmitter.

53. The apparatus of claim 52 wherein said data transmitter transmits said standoff signals and said rotational orientation signals to the earth's surface.

54. The apparatus of claim 41 wherein said distance sensors are selected from the group consisting of acoustic calipers, mechanical calipers, and electrical resistance sensors.

55. The apparatus of claim 41 wherein said plurality of distance sensors comprises three such distance sensors equally spaced around said tool.

56. The apparatus of claim 41 wherein said at least one angle sensor comprises at least one gravitational sensor for indicating the angular orientation of said tool with respect to the direction of the earth's gravity.

57. The apparatus of claim 56 wherein said at least one gravitational sensor is selected from the group consisting of accelerometers, inclinometers, and gyroscopes.

58. The apparatus of claim 41 wherein said at least one angle sensor comprises at least one magnetic sensor for indicating the angular orientation of said tool with respect to the direction of the earth's magnetic field.

59. The apparatus of claim 58 wherein said at least one magnetic sensor comprises a magnetometer.

60. The apparatus of claim 41 wherein said signal processor calculates said estimate of the actual motion of said tool within an earth borehole by
  (a) receiving said standoff signals and said rotational orientation signals,
  (b) generating parameter signals representative of a set of parameters that defines an estimated cross-sectional shape and orientation of the borehole and an estimated position of said tool within the borehole at each of said measurement times,
  (c) combining said standoff signals, said rotational orientation signals, and said parameter signals to generate primary error signals representative of a primary error function proportional to the difference between said estimated cross-sectional shape and the actual cross-sectional shape of the borehole,
  (d) combining said parameter signals and said primary error signals to generate sensitivity signals representative of the sensitivity of said primary error function to each of said parameters, and
  (e) adjusting said parameter signals based on said sensitivity signals to minimize said primary error function and thereby determine optimal values for said parameters.

61. The apparatus of claim 60 wherein said signal processor performs the further function of generating translational displacement signals representative of the lateral translational displacement $s_n$ of said tool according to the equation $$s_n = \sqrt{(xc_{n+1} - xc_n)^2 + (yc_{n+1} - yc_n)^2}$$

wherein $(xc_n, yc_n)$ and $(xc_{n+1}, yc_{n+1})$ are the coordinates of said estimated position of said tool within the borehole at two successive said measurement times.

62. The apparatus of claim 61 wherein said signal processor performs the further function of generating translational velocity signals representative of the lateral translational velocity of said tool by calculating the first derivative of said lateral translational displacement with respect to time.

63. The apparatus of claim 61 wherein said signal processor performs the further function of generating translational acceleration signals representative of the lateral translational acceleration of said tool by calculating the second derivative of said lateral translational displacement with respect to time.

64. The apparatus of claim 60 wherein said signal processor performs the further function of generating rotational displacement signals representative of the rotational displacement θ of said tool according to the equation $$\theta = \theta_{n+1} - \theta_n$$

wherein $\theta_n$ and $\theta_{n+1}$ are said rotational orientation signals of said tool at two successive said measurement times.

65. The apparatus of claim 64 wherein said signal processor performs the further function of generating rotational velocity signals representative of the rotational velocity of said tool by calculating the first derivative of said rotational displacement with respect to time.

66. The apparatus of claim 64 wherein said signal processor performs the further function of generating rotational acceleration signals representative of the rotational acceleration of said tool by calculating the second derivative of said rotational displacement with respect to time.

67. A method of estimating the actual cross-sectional shape of an earth borehole comprising the following steps:
  placing a tool having a plurality of distance sensors in the borehole;
  rotating said tool in the borehole;
  making distance measurements of the distance between said tool and the wall of the borehole at a plurality of points around the circumference of said tool and at a plurality of measurement times;
  making rotational orientation measurements of the rotational orientation of said tool with respect to a reference direction at said plurality of measurement times;
  establishing a set of parameters that defines an estimated cross-sectional shape and orientation of the borehole and an estimated position of said tool within the borehole at each of said measurement times;
  establishing a primary error function proportional to the difference between said estimated cross-sectional shape and the actual cross-sectional shape of the borehole as defined by said distance measurements and said rotational orientation measurements;
  computing the sensitivity of said primary error function to each of said parameters; and
  iteratively adjusting said parameters based on said sensitivity to minimize said primary error function and thereby obtain optimal values for said parameters.

68. The method of claim 67 further comprising the steps of:
  establishing a supplemental error function proportional to the lateral motion of said tool;
  computing the sensitivity of said supplemental error function to each of said parameters; and
  iteratively adjusting said parameters based on said sensitivity of said supplemental error function to minimize said supplemental error function along with said primary error function.

69. The method of claim 68 wherein the terms of said supplemental error function are defined by the equation $$F_n = W \cdot s_n$$

wherein W is a weighting coefficient and $s_n$ is the lateral translational displacement of said tool.

70. The method of claim 68 wherein the terms of said supplemental error function are defined by the equation $$F_n = W_s |s_n - s_n'|$$

wherein $W_s$ is a weighting coefficient, $s_n$ is the value of a measured displacement signal obtained from accelerometers for each of said measurement times, and $s_n'$ is the value of a derived displacement signal obtained from said distance sensors for each of said measurement times.

71. The method of claim 68 wherein the terms of said supplemental error function are defined by the equation $$F_n = W_\alpha |\alpha_n - \alpha_n'|$$

wherein $W_\alpha$ is a weighting coefficient, $\alpha_n$ is the value of a derived acceleration signal obtained from said distance sensors for each of said measurement times, and $\alpha_n'$ is the value of a measured acceleration signal obtained from accelerometers for each of said measurement times.

72. The method of claim 68 wherein the terms of said supplemental error function are defined by the equation $$F_n = W_d |D'''[s_n] - D'''[s_n']|$$

wherein $W_d$ is a weighting coefficient, $D'''[s_n]$ is an mth order finite difference of a measured displacement signal obtained from said distance sensors, and $D'''[s_n']$ is an mth order finite difference of a derived displacement signal obtained from accelerometers.

73. A method for estimating the actual cross-sectional shape and orientation of an earth borehole comprising the following steps:

placing a tool having a radius $r_t$ and a plurality of distance sensors in the borehole;

rotating said tool in the borehole;

measuring distances $d_1$, $d_2$, and $d_3$ between each of three equally spaced locations around the circumference of said tool and three measured points $P_1$, $P_2$, and $P_3$, respectively, on the wall of the borehole at each of a plurality of measurement times;

calculating distances $r_1$, $r_2$, and $r_3$ from the center of said tool to said measured points on the wall of the borehole according to the equations $$r_1 d_1 + r_t$$
$$r_2 d_2 + r_t$$
$$r_3 d_3 + r_t$$

at each of said measurement times;

making a first rotational orientation measurement of the rotational orientation of said tool with respect to a first reference direction of the earth's gravity at each of said measurement times;

making a second rotational orientation measurement of the rotational orientation of said tool with respect to a second reference direction of the earth's magnetic field at each of said measurement times;

comparing said first and second rotational orientation measurements and selecting one of said first or second rotational orientation measurements as a primary rotational orientation measurement $\theta$ with respect to a primary reference direction at each of said measurement times;

establishing a parameter vector $\{X\}$ comprised of parameters $X_m$ that defines an estimated ellipse to approximate the cross-sectional shape and orientation of the borehole and an estimated position of said tool within the borehole at each of said measurement times according to the following equation $$\{X\} = \{r_x, r_y, \psi, xc_1, yc_1, xc_2, yc_2, \ldots, xc_N, yc_N\}$$

wherein $r_x$ is the major radius of said ellipse, $r_y$ is the minor radius of said ellipse, $\psi$ is the angle between said major radius and said primary reference direction, and $(xc_n, yc_n)$ are the coordinates of the center of said tool within the borehole at said estimated position at each of said measurement times;

calculating a point error function e for each of said measured points according to the following equation $$e(x, y, r_x, r_y, \psi) = \sqrt{(x^2 + y^2)\left[\frac{\cos^2(\tan^{-1}(y, x) - \psi)}{r_x^2} + \frac{\sin^2(\tan^{-1}(y, x) - \psi)}{r_y^2}\right]} - 1$$

wherein (x, y) are the coordinates of said measured points for each of said measurement times;

calculating a firing error function $E_n$ for each of said measurement times according to the equation $$E_n(r_x, r_y, \psi, xc_n, yc_n, data_n) =$$

$$\sum_{i=1}^{3} e_i^2(x_i, y_i, r_x, r_y, \psi) = e^2((xc_n + r_1\cos(\theta)), (yc_n + r_1\sin(\theta)), r_x, r_y, \psi) +$$

$$e^2\left(\left(xc_n + r_2\cos\left(\theta + \frac{2\pi}{3}\right)\right), \left(yc_n + r_2\sin\left(\theta + \frac{2\pi}{3}\right)\right), r_x, r_y, \psi\right) +$$

$$e^2\left(\left(xc_n + r_3\cos\left(\theta + \frac{4\pi}{3}\right)\right), \left(yc_n + r_3\sin\left(\theta + \frac{4\pi}{3}\right)\right), r_x, r_y, \psi\right),$$

establishing a primary error function $\{E_T\}$ according to the equation $$\{E_T\} = E_1, E_2, E_3, \ldots, E_N$$

wherein $E_n$ is said firing error function at each of said measurement times;

computing the Jacobian matrix $[J]$ as a measure of the sensitivity of said primary error function $\{E_T\}$ to each of said parameters $X_m$ according to the equation $$J_{m,n} = \frac{\partial E_n}{\partial X_m}$$

wherein $n = 1, 2, 3, \ldots, N$ and $m = 1, 2, 3, \ldots, 2N+3$;

calculating a parameter adjustment vector $\{p\}$ according to the equation $$\{p\} = -\text{PseudoInverse}([J]^T[J] + \lambda[I])([J]^T\{E_T\})$$

wherein $[J]^T$ is the transpose of $[J]$, $\lambda$ is a Levenburg-Marquardt parameter, and $[I]$ is the identity matrix; and iteratively adjusting said parameters according to the relation $$\{X\} = \{X\} + \{p\}$$

to minimize said primary error function and thereby obtain a solution for said parameter vector.

74. The method of claim 73 further comprising the following steps:

calculating a derived lateral translational acceleration of said tool at each of said measurement times according to the equation $$a'_n = \left(\frac{1}{t_{n+1} - t_{n-1}}\right)((xc_{n+1} - 2xc_n + xc_{n-1}), (yc_{n+1} - 2yc_n + yc_{n-1}))$$

wherein $(xc_{n-1}, yc_{n-1})$, $(xc_n, yc_n)$, and $(xc_{n+1}, yc_{n+1})$ are the coordinates of said estimated position of said tool within the borehole at three successive said measurement times $t_{n-1}$, $t_n$, and $t_{n+1}$, respectively;

measuring acceleration signals a1, a2, a3, and a4 produced by four accelerometers ac1, ac2, ac3, and ac4, respectively, mounted at the ends of a first diameter of said tool and a second diameter of said tool, with said first diameter being orthogonal to said second diameter, such that accelerometers ac1 and ac2 are on said first diameter and accelerometers ac3 and ac4 are on said second diameter, according to the equations $a1 = ac + \alpha \cos \beta + g \sin \alpha \cos \gamma$ $a2 = ac - \alpha \cos \beta - g \sin \alpha \cos \gamma$ $a3 = ac + \alpha \sin \beta - g \sin \alpha \sin \gamma$ $a4 = ac - \alpha \sin \beta + g \sin \alpha \sin \gamma$ wherein $ac$ is the centripetal acceleration of said tool, $\alpha$ is the lateral translational acceleration of said tool, $\beta$ is the angle between said first diameter and the direction of said lateral translational acceleration, $g$ is the earth's gravitational constant, $\alpha$ is the inclination angle of said tool with respect to the vertical, and $\gamma$ is the angle between said first diameter and the direction of the in-plane component of gravity, $g \sin \alpha$;

filtering said electrical signals a1, a2, a3, and a4 with a high-pass filter to produce filtered signals fa1, fa2, fa3, and fa4, respectively, according to the equations $fa1 = \alpha c + \alpha \cos \beta$ $fa2 = \alpha c - \alpha \cos \beta$ $fa3 = \alpha c + \alpha \sin \beta$ $fa4 = \alpha c - \alpha \sin \beta$ combining said filtered signals fa1, fa2, fa3, and fa4 to obtain the magnitude and direction of said lateral translational acceleration of said tool in a rotating reference frame of said tool according to the equations $\alpha = \{[(fa1-fa2)/(2)]^2 + [(fa3-fa4)/(2)]^2\}^{1/2}$ $\tan \beta = (fa3-fa4)/(fa1-fa2)$ transforming said lateral translational acceleration from said rotating reference frame of said tool into a fixed reference frame of the earth to obtain a measured lateral translational acceleration of said tool at each of said measurement times;

calculating the magnitude of the difference between said derived lateral translational acceleration and said measured lateral translational acceleration according to the equation $$|a_n - a'_n| = \frac{1}{(t_{n+1} - t_{n-1})^2} \sqrt{\left(xc_{n+1} - 2xc_n + xc_{n-1} - \frac{(fa1-fa2)}{2}\right)^2 + \left(yc_{n+1} - 2yc_n + yc_{n-1} - \frac{(fa3-fa4)}{2}\right)^2}$$

establishing a supplemental error function $\{F_T\}$ according to the equation $\{F_T\} = \{F_1, F_2, F_3, \ldots, F_N\}$ wherein the terms $F_n$ comprising $\{F_T\}$ are calculated according to the equation $F_n = W|\alpha_n' - \alpha_n|$ wherein W is a weighting factor; and minimizing said supplemental error function along with said primary error function.

75. A method of estimating the actual motion of a tool within an earth borehole comprising the following steps:

placing a tool having a plurality of distance sensors in the borehole;

rotating said tool in the borehole;

making distance measurements of the distance between said tool and the wall of the borehole at a plurality of points around the circumference of said tool and at a plurality of measurement times;

making rotational orientation measurements of the rotational orientation of said tool with respect to a reference direction at said plurality of measurement times;

establishing a set of parameters that defines an estimated cross-sectional shape and orientation of the borehole and an estimated position of said tool within the borehole at each of said measurement times;

establishing a primary error function proportional to the difference between said estimated cross-sectional shape and the actual cross-sectional shape of the borehole as defined by said distance measurements and said rotational orientation measurements;

computing the sensitivity of said primary error function to each of said parameters; and iteratively adjusting said parameters based on said sensitivity to minimize said primary error function and thereby obtain optimal values for said parameters.

76. The method of claim 75 further comprising the step of computing the lateral translational displacement $s_n$ of said tool according to the equation $$s_n = \sqrt{(xc_{n+1} - xc_n)^2 + (yc_{n+1} - yc_n)^2}$$

wherein $(xc_n, yc_n)$ and $(xc_{n+1}, yc_{n+1})$ are the coordinates of said estimated position of said tool within the borehole at two successive said measurement times.

77. The method of claim 76 further comprising the step of computing the lateral translational velocity of said tool by calculating the first derivative of said lateral translational displacement with respect to time.

78. The method of claim 76 further comprising the step of computing the lateral translational acceleration of said tool by calculating the second derivative of said lateral translational displacement with respect to time.

79. The method of claim 75 further comprising the step of computing the rotational displacement θ of said tool according to the equation $$\theta = \theta_{n+1} - \theta_n$$

wherein $\theta_n$ and $\theta_{n+1}$ are said rotational orientation measurements of said tool at two successive said measurement times.

80. The method of claim 79 further comprising the step of computing the rotational velocity of said tool by calculating the first derivative of said rotational displacement with respect to time.

81. The method of claim 79 further comprising the step of computing the rotational acceleration of said tool by calculating the second derivative of said rotational displacement with respect to time.

* * * * *